Jan. 19, 1926. 1,569,971
P. GILLIAM
TRUCK
Original Filed Sept. 8, 1922    2 Sheets-Sheet 1

WITNESSES
Guy M Spring

Inventor
PITTMAN GILLIAM
By
Richard B Owen, Attorney

Jan. 19, 1926.  
P. GILLIAM  
TRUCK  
Original Filed Sept. 8, 1922   2 Sheets-Sheet 2

WITNESSES  
Guy M Spring

PITTMAN GILLIAM  Inventor  
By Richard B Owen, Attorney

Patented Jan. 19, 1926.

1,569,971

UNITED STATES PATENT OFFICE.

PITTMAN GILLIAM, OF CLEVELAND, OHIO.

TRUCK.

Application filed September 8, 1922, Serial No. 586,908. Renewed December 14, 1925.

*To all whom it may concern:*

Be it known that I, PITTMAN GILLIAM, a citizen of the United States, residing at Cleveland, in the county of Cuyahoga and State of Ohio, have invented certain new and useful Improvements in Trucks, of which the following is a specification.

This invention relates to trucks.

One important object of the invention is to improve the general construction of devices of this character.

A second important object of the invention is to provide an improved means for connecting the handle common to such devices to the body thereof.

A third important object of the invention is to provide an improved arrangement of the guard or wear irons on a truck of this description.

In the accompanying drawings like characters of reference indicate like parts in the several views, and:—

Figure 4 is an enlarged detail section on the line 4—4 of Figure 2.

Figure 5 is a detail view of one of the side supporting places for the handle.

Figure 1:
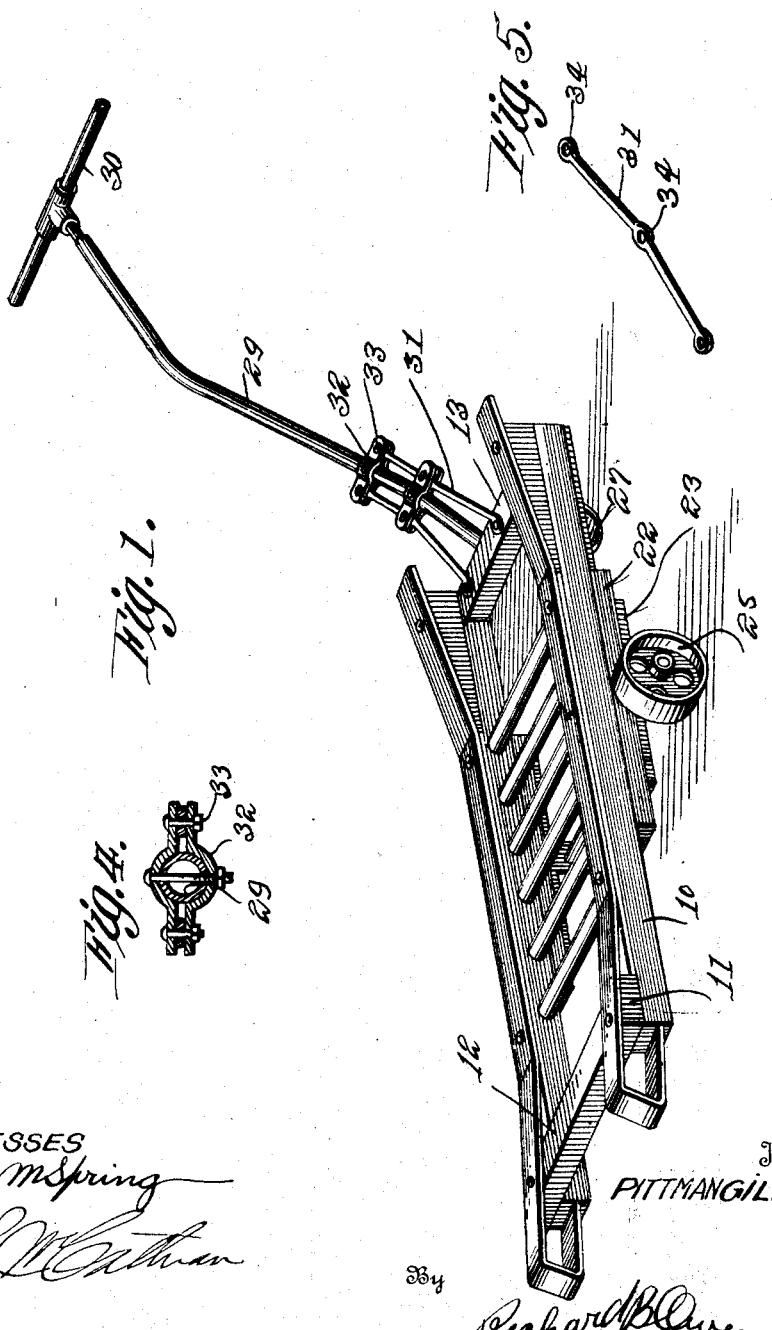
Figure 1 is a perspective view of a truck constructed in accordance with this invention.
Figure 2:
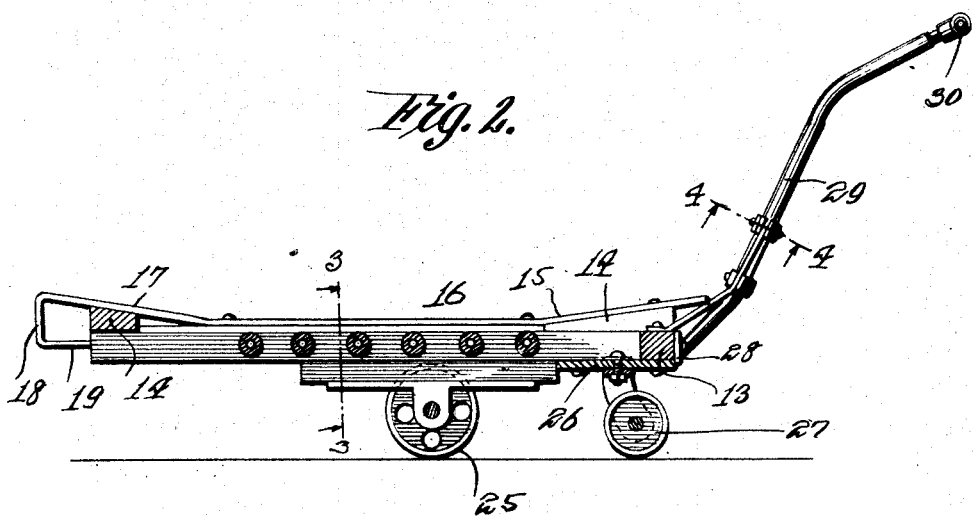
Figure 2 is a longitudinal median section therethrough.
Figure 3:
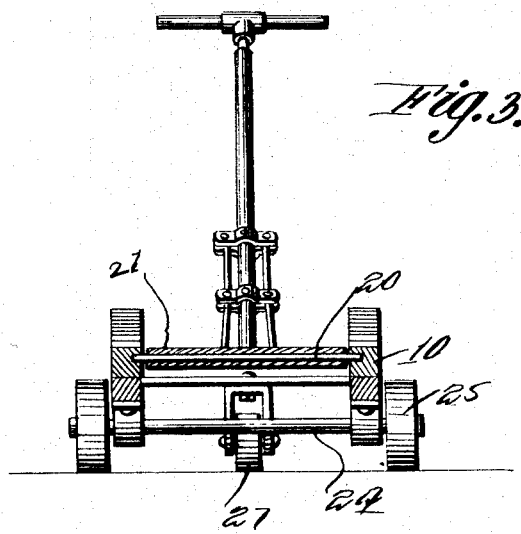
Figure 3 is a section on the line 3—3 of Figure 2.

In the embodiment of the invention herein is disclosed there is provided a truck body consisting of a pair of longitudinal members 10 which are connected at the rear end by a transverse member 11 having its upper side 12 inclined downwardly toward the center of the longitudinal member. The forward ends of the longitudinal members are connected by a transverse member 13 and on the upper sides of these longitudinal members are wedge shaped blocks 14 supporting at an incline front ends 15 of truck irons which extend along the members 10 as at 16 and are then inclined upwardly as at 17 to rest on the inclined surfaces 12 of the transverse member 14. The rear ends of these portions of the truck irons extend rearwardly of the transverse member 14 and are bent down perpendicular to the ground as at 18 and then bent in parallel to the members 10 as at 19, the extremities of the portions 19 resting against the rear ends of said members 10 so that a support is provided for the overhanging portions of the members 17. Between the members 10 at the center portion of the truck extend parallel rods 20 whereon are mounted rollers 21. Beneath the central portions of the members 10 extend longitudinal members 22 which carry bearings 23 on their under sides, an axle 24 being supported in these bearings and having the ground wheels 25 thereon. Extending across the front end of the truck beneath the members 10 is a plate 26 whereon is swivelled a caster wheel 27. Secured to the front face of the front transverse member 13 is a plate 28 from whence extends upwardly a tongue 29 terminating at a cross bar 30, the tongue and cross bar forming means for pulling or pushing the truck. On top of the member 13 are secured the lower ends of brace rods 31 and on the tongue are mounted pairs of clamp plates 32, each pair of plates forming a yoke and the plates of each pair being connected by bolts 33 which pass through these yoke plates and through openings 34 formed in the respective braces 31.

By this means the tongue or handle is kept elevated and is properly braced so as to permit pushing as well as pulling and without undue stress on the plate 28.

It will now be seen that the truck irons may be used to support heavy weights, bridging the longitudinal members 10, and that the elevated position of each and all of these truck irons together with their inclination will prevent such heavy objects from sliding or rolling off.

Furthermore, objects may also be positioned between the side members on the rollers 21.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described but it is desired to include all such as properly come within the scope claimed.

Having thus described the invention what is claimed as new, is:—

In a truck, a frame including a pair of spaced longitudinally extending side members, wedge shaped blocks arranged upon the upper faces of the side members at the forward terminal thereof, truck irons carried by the upper faces of the side members having their forward terminals inclined upwardly and resting upon the inclined faces of the wedge blocks, a transverse connecting member secured to the upper faces of the side members at the rear terminals thereof having its upper face inclined downwardly toward the transverse center of the truck, the rear terminals of the truck irons being inclined upwardly and resting upon the inclined face of the transverse connecting member. the extreme rear terminals of the truck irons being extended rearwardly of the transverse member and provided with depending and inwardly extending extensions engaging the rear terminals of the side members, anti-friction members carried by the side members, and wheels for supporting the frame.

In testimony whereof I affix my signature.

PITTMAN GILLIAM.